Dec. 19, 1933.   J. E. HORSTE   1,939,851
MOWING MACHINE
Filed Oct. 17, 1932   3 Sheets-Sheet 2
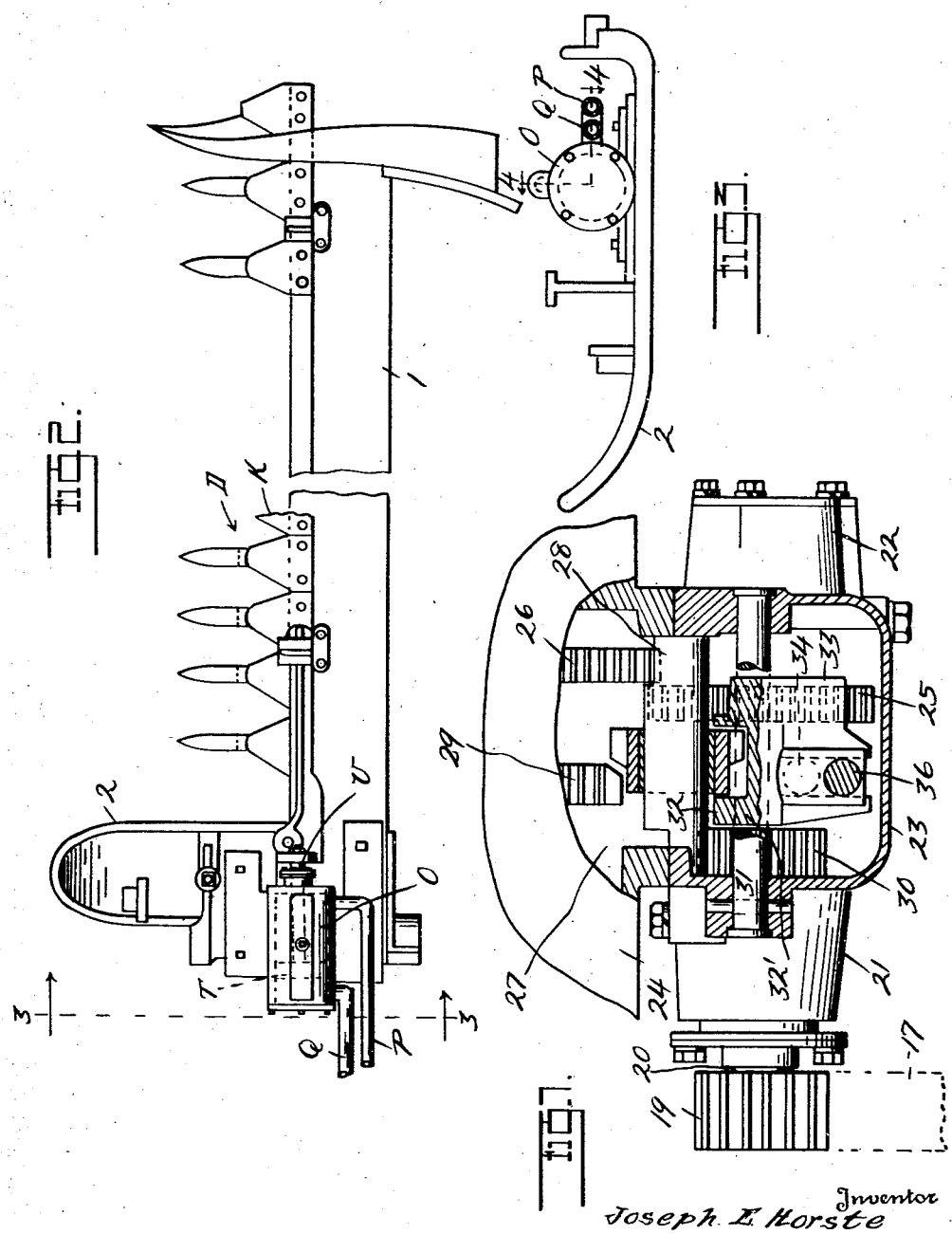
Inventor
Joseph E. Horste
Attorneys Dec. 19, 1933.  J. E. HORSTE  1,939,851
MOWING MACHINE
Filed Oct. 17, 1932  3 Sheets-Sheet 3
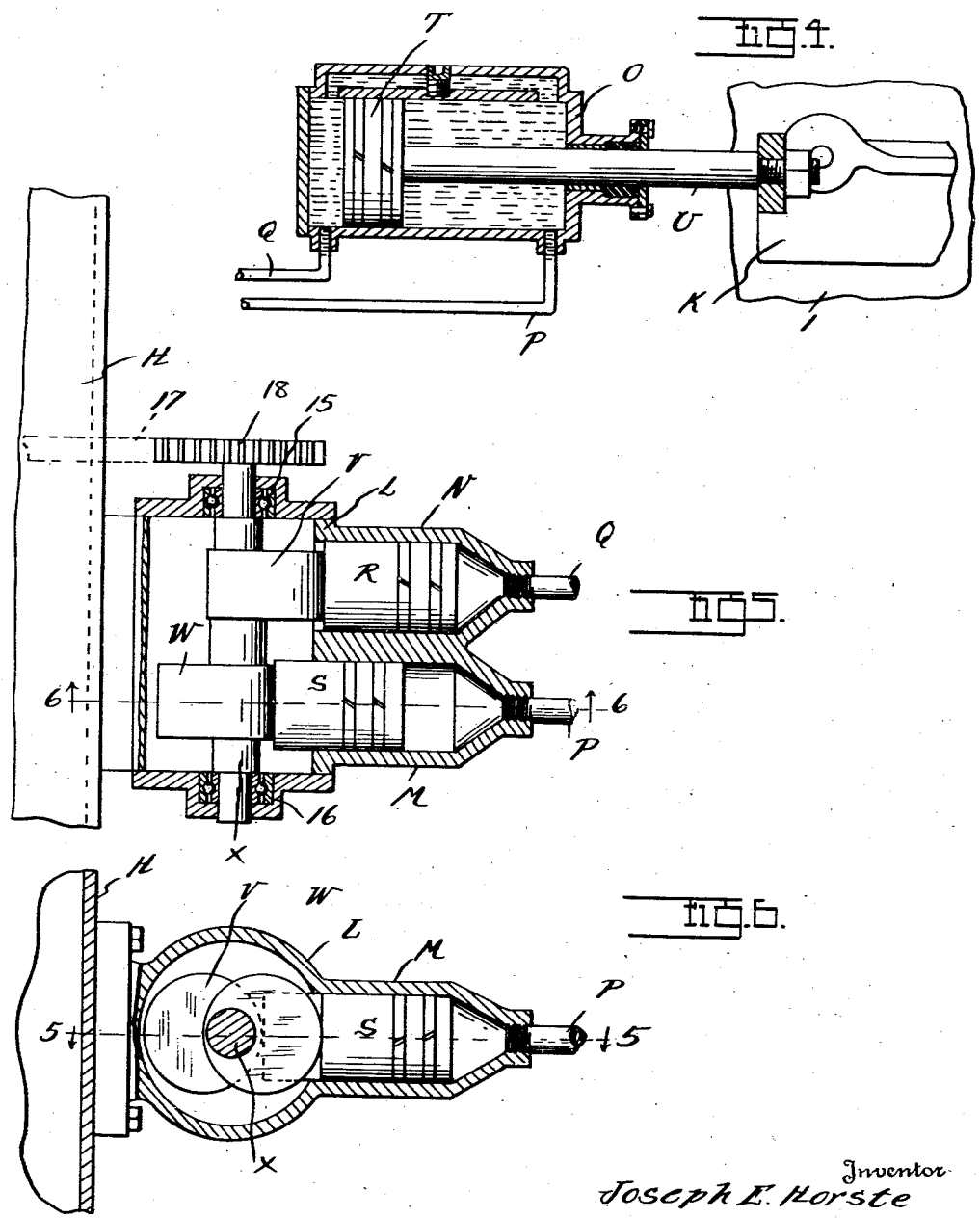

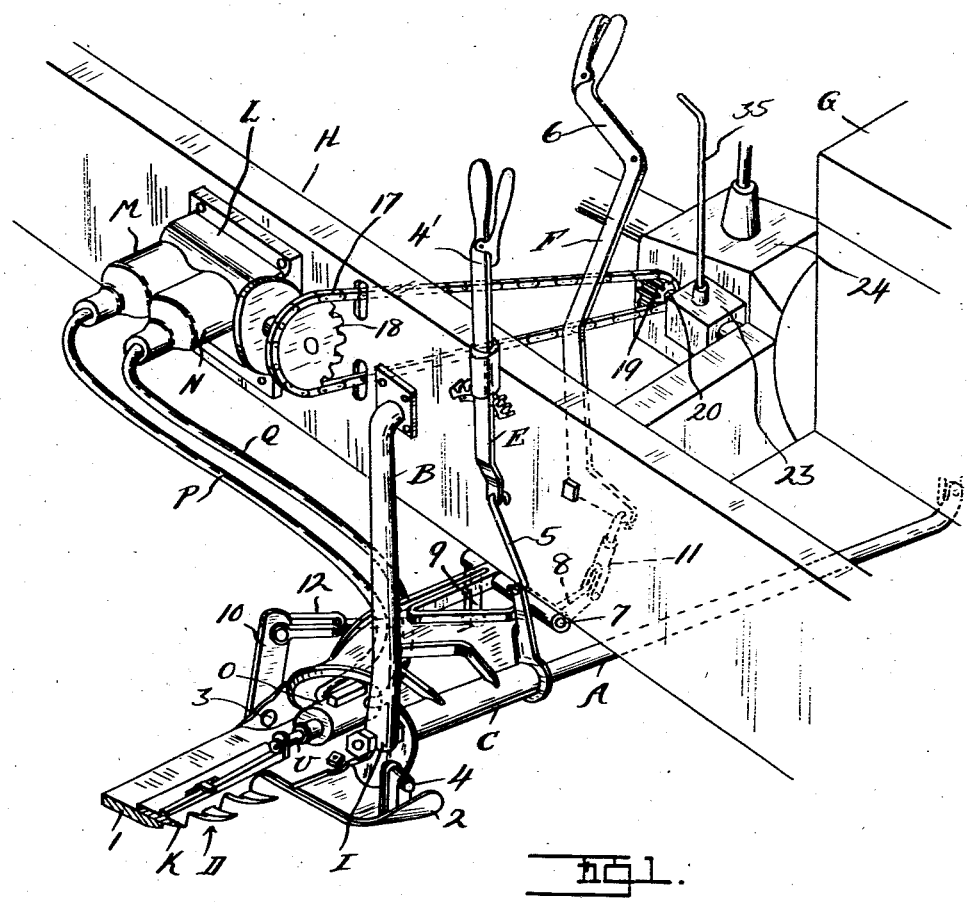

Patented Dec. 19, 1933

1,939,851

UNITED STATES PATENT OFFICE 1,939,851

MOWING MACHINE

Joseph E. Horste, Detroit, Mich., assignor to Detroit Harvester Company, Detroit, Mich., a corporation of Michigan Application October 17, 1932. Serial No. 638,226

4 Claims. (Cl. 36—25)

This invention relates generally to mowing machines and refers more particularly to the means employed for actuating the reciprocating knife of the mowing bar assembly.

One of the essential objects of the invention is to provide the knife with a hydraulic actuating means that is operatively associated with the power plant of the vehicle to which the mowing bar assembly is attached.

Another object is to provide a hydraulic actuating means of the type described wherein parts thereof are carried by the vehicle chassis frame and mowing bar assembly respectively and include cylinders for housing reciprocating pistons.

Another object is to provide a hydraulic actuating means wherein the cylinders just mentioned are connected by flexible pipes or tubing which conduct a suitable fluid between the cylinders for actuating the pistons and at the same time permit the mowing bar assembly to be moved or adjusted relative to the vehicle chassis frame.

Another object is to provide a construction that may be readily connected to the power take-off of the motor driven vehicle and that is safe and efficient in operation.

Other objects, advantages and novel details of construction of this invention will be made more apparent as this description proceeds, especially when considered in connection with the accompanying drawings, wherein:

Figure 1 is a fragmentary perspective view of a truck with a mower attachment embodying my invention applied thereto;

Figure 2 is a fragmentary top plan view of the mower bar and associated parts;

Figure 3 is a sectional view taken on the line 3—3 of Figure 2;

Figure 4 is a vertical sectional view taken substantially on the line 4—4 of Figure 3;

Figure 5 is a horizontal sectional view taken substantially on the line 5—5 of Figure 6;

Figure 6 is a sectional view taken on the line 6—6 of Figure 5.

Figure 7 is a plan view of the transmission housing with parts broken away and in section.

Referring now to the drawings, A is the front drag bar; B is the rear push bar; C is the hinge casting; D is a mowing bar assembly; E is the mower bar tilting means, and F is the mower bar elevating means of a mower construction of conventional design. As shown, the drag bar A and push bar B are connected to the motor block G and supporting sill member H of a suitable vehicle such as a Ford truck and are connected to each other as at I. The casting C is sleeved for pivotal action upon the drag bar A at the inner side of the push bar B and is preferably the configuration illustrated in Figure 1. The mowing bar assembly D includes a mowing bar 1 and a ground engaging shoe 2 that are pivotally connected at 3 and 4 respectively to the casting C and carries a reciprocating knife K of suitable design. The tilting means E preferably comprises a lever 4' and a link 5 terminally connected to the lever and casting C whereby the latter may be tilted on the drag bar A. The elevating means F preferably comprises a lever 6, shaft 7, arms 8 and 9 respectively, lever 10 and links 11 and 12 respectively. Thus by swinging the lever 4' the mowing bar 1 may be raised or lowered about the pivots 3 and 4 respectively.

In the present instance, the knife K on the mowing bar 1 is adapted to be reciprocated by hydraulic means and the latter is preferably operatively connected to the motor of the vehicle to which the mowing bar assembly is attached. As shown, L is a housing upon the sill member H; M and N respectively are cylinders projecting laterally outwardly from the housing L; O is a cylinder upon the mowing bar 1; P is a flexible pipe or tube terminally connected to the cylinders M and O; Q is a flexible pipe or tube terminally connected to the cylinders N and O; R, S and T respectively are pistons within the cylinders N, M and O respectively, and U is a stem terminally connected to the piston T and knife K. Any suitable fluid such as oil may be used in the cylinders M, N and O and pipes P and Q to actuate the piston T, while oppositely extending cams V and W respectively upon a shaft X journaled in bearings 15 and 16 respectively in the housing L are preferably used to actuate the pistons R and S. Preferably the shaft X is driven by a chain 17 and sprocket wheels 18 and 19 form a power take-off shaft 20 of the vehicle and is adapted to be rendered effective or ineffective by suitable mechanism such as that set forth in my Patent No. 1,860,246 dated May 24, 1932. As shown, the power take-off shaft 20 is journaled in lateral projections 21 and 22 respectively of a casing 23 secured to the transmission housing 24 of the vehicle. A gear 25 is splined upon the shaft 20 and is adapted to mesh with and be driven by the countershaft gear 26 of the transmission 27 in the housing 24. 28 is a stationary shaft in the casing and 29 is an idler gear movable longitudinally of the shaft 28 and adapted to mesh with and be driven by the counterweight gear 26. 30 is a gear rigid with the power take-off shaft 20 and adapted to be driven by the idler gear 29 when the latter is in mesh with the countershaft gear 26. 31 is a stationary shaft in the casing; 32 is a shifter element slidable on the shaft 31 and having U-shaped portions 32' and 33 respectively embracing the gears 29 and 25 so that both gears may be moved in unison transversely of the casing to and from engagement with the countershaft gear 26. 34 is a crank for moving the shifter 32 longitudinally of the shaft 31 and 35 is an operating handle having a shank 36 thereof connected to the crank 34.

In use, when the driven connection between the gears 25 and 26 is established the shaft X will be rotated and will cause the cams V and W to alternately engage and move the pistons R and S in the cylinders N and M. Consequently the fluid actuated by these pistons will be forced against opposite ends of the piston T in the cylinder O and will cause such piston, stem U and knife K to reciprocate. Thus it will be apparent that the knife K will be reciprocated as long as the shaft X is rotating and regardless of the position of the bar 1 and casting C relative to the drag bar A. When it is desired to stop the knife K the operating handle 35 may be manipulated so that the driving connection between the gears 25 and 26 may be broken. When not in use the bar 1 and knife K carried thereby may be elevated in the usual way by the lever 6.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. In a mower attachment for vehicles, a closed fluid circuit including adjacent cylinders, a third cylinder having a fluid inlet connected to one of said adjacent cylinders and having an outlet connected to the other of said adjacent cylinders, a piston in the third cylinder actuable by the fluid in the circuit, a knife actuable by said piston, and actuating means for the fluid in said circuit including pistons in said adjacent cylinders, a rotary shaft, and cams on said shaft engaging said last mentioned pistons.

2. In a mower attachment for vehicles, a closed fluid circuit including adjacent cylinders, a third cylinder having a fluid inlet connected to one of said cylinders and having a fluid outlet connected to the other of said cylinders, means in the third cylinder actuable by fluid in the circuit, a knife actuable by said means, and actuating means for the fluid in said circuit including means in said adjacent cylinders, a rotary shaft, and a driving connection between said shaft and last mentioned means.

3. In a mower, a reciprocating knife, a reciprocating piston connected to the knife, and means for forcing a fluid against opposite ends of the piston to cause the knife to be reciprocated, including a rotary shaft operable by a power take-off shaft of a motor driven vehicle, pistons adjacent and movable at right angles to said shaft, and means associated with the rotary shaft for alternately actuating the last mentioned pistons.

4. In a mower, a reciprocating knife, a reciprocating piston connected to the knife, and means for forcing a fluid against opposite ends of the piston including a rotating shaft, pistons movable at right angles to the shaft, and cams on the shaft engageable with said pistons and operable to alternately actuate the same.

JOSEPH E. HORSTE.